Vern D. Rankin
Johnny L. Bundick
Eddie W. Bundick
INVENTORS

United States Patent Office 3,335,288
Patented Aug. 8, 1967

3,335,288
VOLTAGE REGULATING SPEED CONTROL FOR WELDERS
Vern D. Rankin, Johnny L. Bundick, and Eddie W. Bundick, Odessa, Tex.; said Rankin assignor, by mesne assignments, to Auxiliary Idler Manufacturing Company, a corporation of Texas
Filed Apr. 20, 1965, Ser. No. 449,578
6 Claims. (Cl. 290—40)

This invention relates to welding apparatus and more particularly to an electric welding control system having a generator adapted to supply energizing voltage for accessory loads such as lamps and motor operated tools.

The electric welding generator system of the present invention is associated with a speed controlled engine of the internal combustion type having an idling speed control device through which the speed of the engine is increased above its idling speed when current flows through the armature circuit of the generator in response to establishment of a welding arc between the welding electrodes to which the generator armature is electrically connected. Although welding generator systems which are operative to increase the speed of the engine when sensing the flow of welding current are well known, such systems are incapable of supplying the requisite energizing voltage for accessory loads when the welding apparatus is not being utilized for welding purposes. It is therefore the primary object of the present invention to provide an improved electric welding control system whereby energizing voltage for accessory loads will be available at all times whether or not the welding apparatus is in use.

An additional object of the present invention in accordance with the foregoing objects is to provide an electric welding control system associated with a D.C. generator having an exciter armature adapted to be connected to accessory loads with facilities for energizing the speed controlling device associated with the engine which drives the generator in order to increase the speed thereof whenever an accessory load completes the armature circuit for the exciter section of the welding generator.

A further object of the present invention is to provide an electric welding control system associated with a speed controlling device for the engine which drives the welding generator and including a relay component operative to connect the speed controlling device to the output armature circuit of the welding generator whenever welding current is being conducted therethrough so that operation of the speed controlling device may alternatively be effected by accessory loads or by the welding operation.

Figure 1:
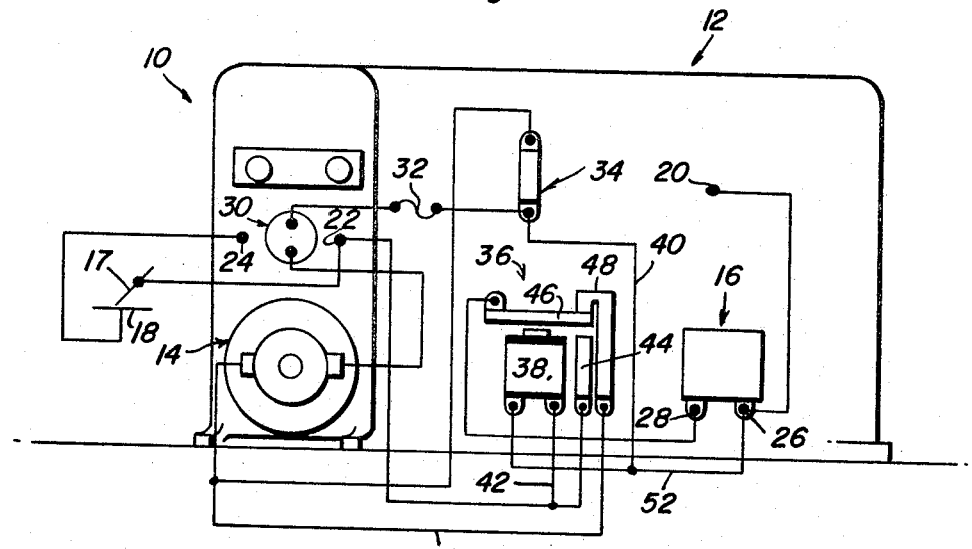
Figure 2:
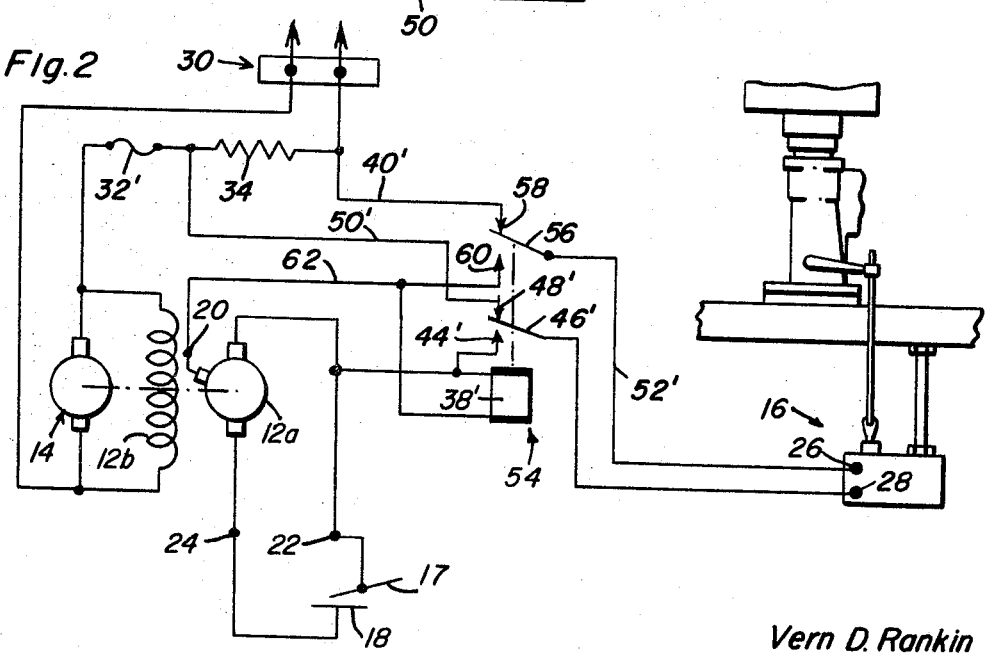

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a simplified schematic view of the apparatus associated with the present invention and includes an electrical circuit diagram illustrating one form of a control system in accordance with the present invention; and FIGURE 2 is an electrical circuit diagram illustrating another form of control system associated with the present invention.

Referring now to the drawings in detail, the welding control system and apparatus associated with the present invention is generally denoted by reference numeral 10 in FIGURE 1. The apparatus therefore includes an engine and generator assembly generally referred to by reference numeral 12, this apparatus being of conventional construction involving an internal combustion type of engine driving a D.C. generator having an exciter armature section 14. The output terminals 22 and 24 of the generator are as usual, connected to the welding electrodes 17 and 18. Also associated with the engine, is a speed controlling device generally referred to by reference numeral 16. This device may be of the electric-vacuum type such as disclosed in Patent No. 2,488,171 operative to increase the speed of the engine above idling speed whenever current is conducted through the output armature of the generator upon establishment of an arc between the welding electrodes. Also associated with the welding apparatus, is a receptacle 30 having a pair of terminals to which accessory loads are adapted to be connected such as lamps and motor operated tools. It will also be noted from FIGURE 1 that a neutral terminal 20 is associated with the engine driven generator assembly connected to the terminal 26 of the speed controlling device 16 which also has a terminal 28. Accordingly, voltage supplied across the terminals 26 and 28 of the speed controlling device will be operative to energize the device in order to perform its aforementioned function of increasing the speed of the engine in order to produce sufficient output voltage from either the output terminals 22 and 24 of the generator necessary to perform the welding function or sufficient energizing voltage at the terminals of the receptacle 30 necessary to energize any accessory loads connected thereto.

As will be noted from FIGURE 1, one of the output brushes of the exciter armature section 14 is directly connected to one of the terminals at the receptacle 30 while the other output brush of the exciter armature section is connected to the other terminal at the receptacle 30 through a load resistor 34 in series with a slow-blow fuse device 32. The resistor 34 is arranged to properly load the armature circuit of the armature section 14 when current is being drawn by an accessory load connected through the receptacle 30. The speed controlling device 16 is therefore also connected to the armature circuit of the exciter section so that the speed controlling device may be operated when an accessory load completes the armature circuit of the exciter section in order to increase the speed of the engine and the output of the generator for such purpose. Toward this latter end, one terminal of the resistor 34 is connected by a conductor 40 to the conductor 52 thereby connecting the resistor to terminal 26 of the speed controlling device. The other terminal 28 of the speed controlling device is connected by the current sensing relay component 36 to the other terminals of the resistor 34. In this fashion, the speed controlling device 16 is connected in shunt relation to the load resistor 34 so that it may be energized whenever the armature circuit of the exciter section is completed by any accessory load.

As shown in FIGURE 1, the relay component 36 includes a relay coil 38 one terminal of which is connected by a conductor 42 to the output terminal 22 of the generator. The other terminal of the relay coil 38 is connected to the neutral point 20 of the generator through terminal 26 of the speed controlling device. Accordingly, the relay coil 38 will sense any flow of welding current through the armature circuit associated with the output terminals 22 and 24 of the generator. When deenergized, the relay switch 46 associated with the relay component will establish contact with the contact member 48 as illustrated in FIGURE 1 thereby electrically connecting the terminal 28 of the speed controlling device to the conductor 50 which is connected to that output brush of the exciter section 14 to which the load resistor 34 is connected. Accordingly, when the relay component 36 is deenergized, the speed controlling device 16 is connected to the output of the exciter section as aforementioned. However, upon energization of the relay coil 38, the relay switch 46 is displaced to its other position engaging the contact member 44 in order to establish an electrical connection between the output terminal 22 of the generator and the terminal 28 of the speed controlling device 16. Thus, control of the speed controlling device is transferred from the armature circuit of the exciter section to the output armature circuit associated with the generator whenever an arc is established between the welding electrodes 17 and 18.

Referring now to FIGURE 2, it will be observed that the generator includes the output armature 12a to which the output terminals 22 and 24 are electrically connected, the neutral point 20 also being electrically connected to the output armature. Also associated with the output armature is the main generator field coil 12b connected across the exciter armature section 14. In the form of the control system illustrated in FIGURE 2, the exciter armature section 14 is connected to the load receptacle 30 in series with the fuse device 32' and the load resistor 34. A current sensing relay component 54 is associated with the control system of FIGURE 2 including a relay coil 38' one terminal of which is connected to the output terminal 22 of the generator output armature 12a, the other terminal of the relay coil being connected to the neutral terminal 20. When the welding apparatus is not in use, the armature circuit will be opened so that the relay coil 38' is deenergized as illustrated in FIGURE 2. In the deenergized condition, terminal 26 of the speed controlling device 16 is connected by conductor 52' and relay switch 56, contact 58 and conductor 40' to one side of the load resistor 34, the other side of the load resistor being electrically connected by the conductor 50', contact 48' and relay switch 46' to the terminal 28 of the speed controlling device. Accordingly, the speed controlling device will be connected in shunt relation to the load resistor so that it may be energized when the armature circuit of the exciter section 14 is closed by any accessory load connected thereto by the receptacle 30. On the other hand, the speed controlling device will be energized by supply of voltage thereto from the output armature 12' of the generator whenever an arc is established across the welding electrodes 17 and 18. Accordingly, when welding current flows through the armature circuit associated with the armature 12a', the relay coil 38' will be energized in order to displace the relay switches 46' and 56 into engagement with the contacts 44' and 60. Terminal 26 of the speed controlling device will then be electrically connected by the conductors 52' and conductor 62 to the neutral terminal 20 while the terminal 28 of the speed controlling device will be electrically connected to the output terminal 22.

From the foregoing description, the construction, operation and utility of the electric welding control system of the present invention will be apparent. Operation of the control system should therefore be apparent. To summarize operation thereof, it will be recalled that when the output armature circuit associated with the generator is opened the speed controlling device 16 will be electrically connected to the armature circuit of the exciter section 14 in shunt relation to the load resistor 34. The load resistor is provided so that the voltage supplied across the terminals at the receptacle 30 will be of the proper value for energizing the accessory load and at the same time supply energizing voltage to the speed controlling device 16 in order to increase the speed of the engine above idling speed thereby establishing the proper voltage for the accessory load. It will therefore be apparent that accessory loads may be operated even though the welding apparatus is not in use. When, however, the welding apparatus is in use and an arc is established between the welding electrodes 17 and 18, the flow of welding current in the output armature circuit of the generator will be sensed by the relay coil in the relay component 36 as shown in FIGURE 1 or 54 as shown in FIGURE 2. Upon energization of the relay coil, the connection between the speed controlling device 16 and the armature circuit of the exciter section 14 is transferred to the output armature circuit of the generator in order to supply energizing current to the speed controlling device for operation thereof in the usual manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an engine driven welding generator having an exciter section adapted to be connected to an accessory load and a speed controlling device energized for increasing the speed of the generator above idle speed when supplying welding current, a load resistor connected in series with said exciter section for supply of energizing voltage to the accessory load only when the speed of the generator is increased above said idle speed, switch means connecting said speed controlling device in shunt relation to the load resistor for energization thereof when the accessory load is connected to the load resistor, and current sensing means operatively connected to the generator for operating the switch means to energize the speed controlling device in response to said supply of welding current by the generator.

2. The combination of claim 1 wherein said switch means comprises a relay switch normally positioned to electrically connect the exciter section to the speed controlling device, said relay switch being displaceable by the current sensing means to a second position electrically connecting the generator to the speed controlling device.

3. The combination of claim 1 wherein said switch means comprises a pair of relay switches normally positioned to electrically connect the speed controlling device across the load resistor, said relay switches being displaceable by the current sensing means to connect the generator to the speed controlling device.

4. The combination of claim 1 wherein said current sensing means comprises a relay coil connected to the generator and operable to actuate said switch means when welding current flows.

5. The combination of claim 4 wherein said switch means comprises a relay switch normally positioned to electrically connect the exciter section to the speed controlling device, said relay switch being displaceable by the current sensing means to electrically connect the generator to the speed controlling position.

6. In combination with a D.C. welding generator having a pair of output terminals connected to welding electrodes, a neutral terminal and an exciter armature adapted to be connected to an accessory load, an engine driving said generator having a speed controlling device, current sensing coil means connected to one of said output terminals and the neutral terminal for energization in response to establishment of an arc between said welding electrodes, load means operatively connected to the exciter armature for loading thereof when connected to said accessory load, switch means electrically connecting the speed controlling device to the exciter armature in shunt relation to the load means for increasing the speed of the engine to establish an energizing voltage for the accessory load, and means responsive to energization of said current sensing coil means for transferring the connection of the speed controlling device from the exciter armature to said one of the output terminals of the generator to increase the speed of the engine when said arc is established between the welding electrodes.

No references cited.

ORIS L. RADER, *Primary Examiner.*

G. SIMMONS, *Assistant Examiner.*